Nov. 29, 1966  S. L. LEAVITT  3,288,652
RIVETED FUEL CELL ELECTRODE ASSEMBLY
Filed March 27, 1962
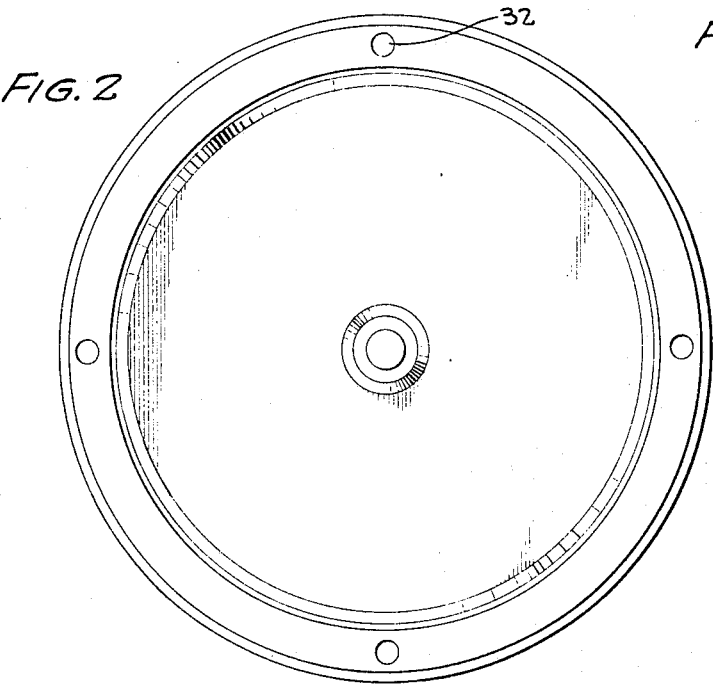
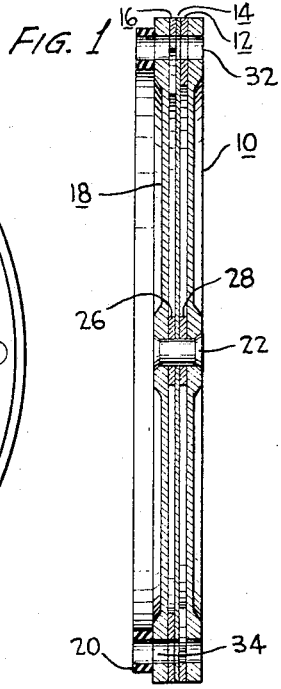
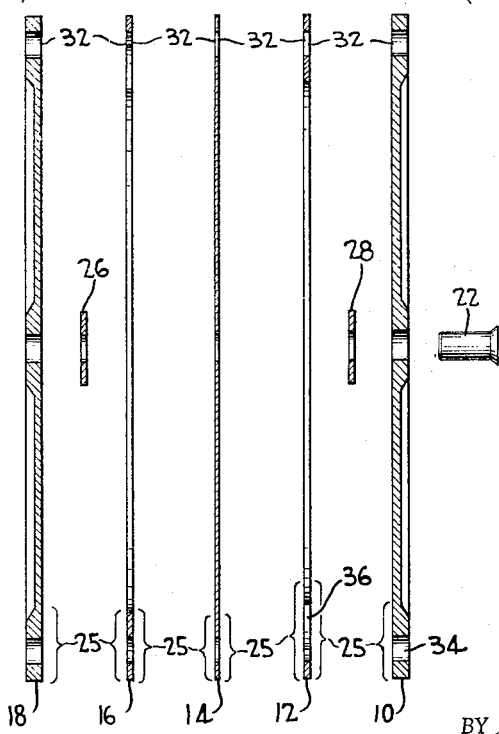
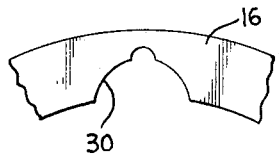
STANLEY L. LEAVITT
INVENTOR
BY *Watson, Cole, Grindle & Watson*
ATTORNEYS

United States Patent Office 3,288,652
Patented Nov. 29, 1966

3,288,652
RIVETED FUEL CELL ELECTRODE ASSEMBLY
Stanley L. Leavitt, Simsbury, Conn., assignor, by mesne assignments, to Leesona Corporation, Cranston, R.I., a corporation of Massachusetts
Filed Mar. 27, 1962, Ser. No. 182,845
7 Claims. (Cl. 136—120)

This invention relates to an improved electrode assembly and more particularly, to an improved fuel cell electrode assembly and methods of assembling the cells.

Priorly, numerous forms of arrangements and assemblies of electrodes have been employed in fuel cells. For example, it is known to form an electrode assembly as a "bipolar" structure in which two electrodes are mounted on opposite sides of the unit and are separated by an impervious gas separator member called herein a gas baffle and an annular ring between each electrode and the gas baffle to permit the circulation of the gas between the baffle and the electrode. One form of bipolar electrode structure is described in "Fuel Cells" by Reinhold Publishing Company, copyright 1960, and specifically, on pages 56 and 57 thereof. One of the problems encountered in these bipolar assemblies is that of the size limitation on the electrode when employed in a high pressure system. For example, if the gas is introduced under pressure between the gas baffle and the electrode, the electrode will tend to bow and under extreme conditions, can short-circuit the battery by touching the adjacent electrode of the next assembly. A still further disadvantage of this type of assembly is the damage and high rejection rate of the electrodes when the assembly is welded together.

Accordingly, it is an object of this invention to provide an improved bipolar structure which obviates the above mentioned disadvantages.

It is another object of this invention to provide an improved bipolar assembly which can be quickly and easily fabricated and is mechanically held together without the use of welds or bolts.

It is another object of the invention to provide an improved fuel cell electrode assembly and methods of fabrication without introducing thermal stresses which would otherwise distort or crack the electrodes.

Briefly, in accordance with the aspects of this invention, a bipolar assembly is formed of a pair of electrodes, a gas baffle between the electrodes and a pair of annular rings, one located between each of the electrodes and the gas baffle and a rivet joining the electrodes by passing through the gas baffle. Advantageously, this rivet need not be insulated in a bipolar mount since the electrodes of a bipolar mount are electrically connected in series. Also advantageously, the use of the rivet eliminates welding and the incident thermal stresses usually encountered in fabricating the prior art types of bipolar mounts. In accordance with further advantages, the rivet prevents bowing of the electrodes and serves an alignment function in assembling the bipolar mounts. The separate elements of the bipolar assembly can be pre-tinned with solder to form a suitable fluid seal around the periphery of the elements without introducing thermal stresses which are normally incident to welding. Alternatively, the peripheries may be brazed together by any one of the well-known brazing techniques.

These and various other objects and features of the invention will be more clearly understood from a reading of the detailed description of the invention in which:

FIG. 1 is a view in section of one illustrative embodiment of this invention;

FIG. 2 is a view in elevation of the embodiment of FIG. 1;

FIG. 3 is an exploded representation of the elements of FIG. 1; and,

FIG. 4 is a detail view to an enlarged scale of a portion of the spacer rings shown in FIGS. 1 and 3.

Referring now to FIG. 1, there is shown a bipolar assembly including a first electrode 10, a spacer ring 12, a gas baffle 14, a second spacer ring 16, a second electrode 18, and an annular insulating ring 20, positioned in that order from right to left. Although the electrodes are represented as being dished metallic members, it is understood that the opposite sides of the electrodes 10 and 18 are filled with porous sintered nickel for hydrogen and oxygen electrodes. The backs of these electrodes are provided with a thin perforated plate (not shown) for conducting gas from the gas chambers to the electrodes. Advantageously, these electrodes as well as the other elements of the bipolar assembly, are aligned and assembled on a rivet 22. The rivet shown in FIG. 3 has not been inserted. The rivet 22 in FIG. 1, however, has been inserted and compressed to retain the assembly together.

Prior to the assembly, the edges or peripheries of the respective elements 10, 12, 14, 16 and 18 may be tinned and soldered or brazed so that they define an efficient fluid seal at their periphery. This brazing is accomplished in the peripheral area such as that indicated by brackets 25 in FIG. 3. The assembly includes a pair of spacing washers or spacers 26 and 28 which provide support for the electrodes in the region of the rivet 22. In the final assembly, as best seen in FIG. 1, a compact rigid junction is formed at the center of the electrode assembly. While the rivet is shown centrally located with respect to the electrodes, it is understood that one or more rivets may be positioned at any convenient point around the electrode surface and that this position is shown merely for simplicity and convenience.

As best seen in FIG. 4, the spacer ring, such as ring 16, has a notch 30 communicating with the passage 32 which passes through one edge of the assembly. For example, one of the gases may be fed through passage 32 and this gas will enter the region between electrode 18 and gas baffle 14 through the notch 30. A similar arrangement is employed in the diametrically opposite edge of the assembly which includes a passage 34. This passage may be employed to feed the other of the gases to the electrode assembly and in this particular respect spacing ring 12 has a notch 36 corresponding to notch 30 in ring 16 for permitting this second gas to enter the region between baffle 14 and electrode 10. The next adjacent bipolar assembly will be identical in each respect to that disclosed in FIG. 1. The region within annular ring 20, adjacent electrode 18 and the next electrode 10, not shown, is the region filled with electrolyte. The entire assembly of bipolar mounts is joined together in a tank or other container by suitable means, not shown, and electrolyte fuel and oxidizing gases are fed to the cell through conduits in a manner well known in the art.

While I have shown and described one illustrative embodiment of this invention, it is understood that the concepts thereof may be employed in other embodiments without departing from the spirit and scope of this invention.

What is claimed is:
1. A fuel cell bipolar electrode assembly comprising a first circular electrode, a first annular spacing ring, a circular gas impervious barrier, a second annular spacing ring, and a second electrode stacked in that order and axially aligned and having common peripheral dimensions, a rivet passing axially through said electrodes internally of the periphery and a pair of spacing washers on said rivet, each spacing washer being positioned in the place of one of said annular spacing rings, and solder means around the periphery of each of the electrodes, each of the annular spacing members and the gas barrier to define a fluid seal at the periphery of said assembly.

2. A fuel cell bipolar electrode assembly comprising a first circular electrode, a first annular spacing ring, a circular gas impervious barrier, a second annular spacing ring, and a second electrode stacked in that order axially aligned and having common peripheral dimensions, a rivet passing axially through said electrodes internally of the periphery and a pair of spacing washers on said rivet, each spacing washer being positioned in the plane of one of said annular spacing rings, and brazing means around the periphery of each element of the assembly to define a fluid seal at the periphery of said assembly.

3. The method of assembling a bipolar fuel cell comprising the steps of assembling two outer electrodes of different polarities with an intermediate gas impervious barrier each of common peripheral dimension, interspersing spacer means of similar peripheral dimension between said electrodes and barrier, riveting said assembly together in the internal portion of the assembly remote from the periphery, and sealing of the periphery after riveting to withstand internal fluid pressure.

4. The method defined in claim 3, wherein the sealing step comprises pretinning the periphery of the electrodes, barrier and spacers before riveting and soldering the pretinned members together to form the fluid pressure seal.

5. The method defined in claim 3, wherein the sealing step comprises brazing the common peripheral areas of the electrodes, barrier and spacers together after riveting to form the fluid pressure seal.

6. A bipolar fuel cell assembly comprising a first substantially planar electrode member, a first spacing member extending only about the peripheral areas of the electrode member, a second similar electrode member and spacing member, a gas impervious barrier member, the members all having common peripheral dimensions registered with the barrier member intermediate the electrode members and spaced therefrom by the spacing members, a rivet passing axially through said electrodes and barrier member internally and remotely located from their periphery to hold the members together and brazing means around the periphery of each element of the assembly to define a fluid seal at the periphery of said assemblies.

7. A fuel cell electrode assembly comprising a first substantially planar electrode member, a spacing member extending only about the peripheral areas of the electrode member, a second similar electrode member, the members all having common peripheral dimensions, with said spacing member separating said electrode members, a rivet passing axially through said electrode members internally and remotely located from their periphery to hold the assembled members together and brazing means around the periphery of each element of the assembly to define a fluid seal at the periphery of said assembly.

References Cited by the Examiner
UNITED STATES PATENTS

| | | | |
|---|---|---|---|
| 1,592,512 | 7/1926 | Allan | 204—256 |
| 2,686,154 | 8/1954 | MacNeill | 204—301 |
| 2,969,315 | 1/1961 | Bacon | 136—120 |
| 2,980,749 | 4/1961 | Broers | 136—86 |
| 3,012,086 | 12/1961 | Vahldieck | 136—86 |
| 3,092,516 | 6/1963 | Rightmire | 136—86 |
| 3,101,285 | 8/1963 | Tantram et al. | 136—120 |
| 3,146,131 | 8/1964 | Lunden et al. | 136—86 |

FOREIGN PATENTS

| | | |
|---|---|---|
| 603,683 | 4/1926 | France. |
| 850,671 | 9/1939 | France. |
| 871,950 | 7/1961 | Great Britain. |
| 884,905 | 12/1961 | Great Britain. |
| 425,444 | 11/1946 | Italy. |

JOHN H. MACK, *Primary Examiner.*

WINSTON A. DOUGLAS, *Examiner.*

J. R. SPECK, W. VAN SISE, *Assistant Examiners.*